(12) United States Patent
Nagai et al.

(10) Patent No.: US 10,174,183 B2
(45) Date of Patent: Jan. 8, 2019

(54) ORGANIC BINDER, GRANULAR MATERIAL, THREE-DIMENSIONAL LAMINATION-SHAPED MOLD MANUFACTURING APPARATUS, AND THREE-DIMENSIONAL LAMINATION-SHAPED MOLD MANUFACTURING METHOD

(71) Applicant: TECHNOLOGY RESEARCH ASSOCIATION FOR FUTURE ADDITIVE MANUFACTURING, Tokyo (JP)

(72) Inventors: Yasuhiro Nagai, Takasaki (JP); Kosuke Takeshita, Takasaki (JP); Yoshikazu Ooba, Yokohama (JP); Satoshi Imamura, Tsukuba (JP); Toshimitsu Okane, Tsukuba (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 247 days.

(21) Appl. No.: 14/908,510

(22) PCT Filed: Mar. 9, 2015

(86) PCT No.: PCT/JP2015/056883
§ 371 (c)(1),
(2) Date: Feb. 2, 2016

(87) PCT Pub. No.: WO2016/143050
PCT Pub. Date: Sep. 15, 2016

(65) Prior Publication Data
US 2017/0037222 A1    Feb. 9, 2017

(51) Int. Cl.
    *B22C 1/22*    (2006.01)
    *B22C 9/02*    (2006.01)
    (Continued)

(52) U.S. Cl.
    CPC .............. *C08K 9/04* (2013.01); *B22C 1/224* (2013.01); *B22C 1/2253* (2013.01); *B22C 9/02* (2013.01);
    (Continued)

(58) Field of Classification Search
    None
    See application file for complete search history.

(56) References Cited

U.S. PATENT DOCUMENTS 4,033,925 A * 7/1977 Anderson ............... B22C 1/224
                                                    523/144
4,175,067 A * 11/1979 Kottke .................... B22C 1/224
                                                    524/442
(Continued)

FOREIGN PATENT DOCUMENTS

CN    102076440 A    5/2011
CN    104066532 A    9/2014
(Continued)

OTHER PUBLICATIONS

International Search Report (ISR) dated Apr. 22, 2015 for International Application No. PCT/JP2015/056884.
(Continued)

*Primary Examiner* — Mary Lynn F Theisen
(74) *Attorney, Agent, or Firm* — Ladas & Parry LLP

(57) ABSTRACT

In order to well perform recoating regardless of the type of granular material and reuse a refractory aggregate in an unprinted portion without any regeneration process in the manufacture of a three-dimensional lamination-shaped mold, this invention provides a granular material for use in
(Continued)

shaping a three-dimensional laminated mold, which is coated with an acid as a catalyst which activates and cures an organic binder for binding the granular material. The acid contains at least one of sulfuric acid, phosphoric acid, a sulfonic acid and a carboxylic acid, and is one of a mixture of sulfuric acid and another acid, phosphoric acid only, a mixture of phosphoric acid and another acid, sulfonic acid only, a mixture of sulfonic acid and another acid and a mixture of a carboxylic acid and another acid.

14 Claims, 2 Drawing Sheets

(51) Int. Cl.
| | |
|---|---|
| B22C 9/12 | (2006.01) |
| C08K 9/04 | (2006.01) |
| B29C 64/165 | (2017.01) |
| B33Y 10/00 | (2015.01) |
| B33Y 30/00 | (2015.01) |
| B33Y 70/00 | (2015.01) |
| B29B 15/10 | (2006.01) |
| B29C 33/38 | (2006.01) |
| C03C 1/02 | (2006.01) |
| C03C 8/02 | (2006.01) |
| C03C 8/14 | (2006.01) |
| C09D 161/06 | (2006.01) |
| C09D 171/14 | (2006.01) |
| B29K 105/16 | (2006.01) |
| B29K 509/00 | (2006.01) |

(52) U.S. Cl.
CPC .............. B22C 9/12 (2013.01); B29B 15/105 (2013.01); B29C 33/3807 (2013.01); B29C 33/3842 (2013.01); B29C 64/165 (2017.08); C03C 1/026 (2013.01); C03C 8/02 (2013.01); C03C 8/14 (2013.01); C09D 161/06 (2013.01); C09D 171/14 (2013.01); B29K 2105/16 (2013.01); B29K 2509/00 (2013.01); B29K 2995/0096 (2013.01)

(56) References Cited

U.S. PATENT DOCUMENTS

| | | | | |
|---|---|---|---|---|
| 4,176,114 A | * | 11/1979 | Stewart | .................. B22C 1/224 |
| | | | | 164/16 |
| 8,741,194 B1 | * | 6/2014 | Ederer | ..................... B22C 9/00 |
| | | | | 264/113 |
| 8,919,421 B2 | | 12/2014 | Frohn et al. | |
| 9,796,015 B2 | | 10/2017 | Fukuda et al. | |
| 2003/0133822 A1 | | 7/2003 | Harryson | |
| 2004/0056378 A1 | | 3/2004 | Bredt et al. | |
| 2005/0017394 A1 | * | 1/2005 | Hochsmann | ......... B29C 64/165 |
| | | | | 264/113 |
| 2008/0125517 A1 | * | 5/2008 | Clingerman | ............ B22C 1/224 |
| | | | | 523/144 |
| 2011/0073269 A1 | | 3/2011 | Frohn et al. | |
| 2013/0221191 A1 | * | 8/2013 | Sears | ........................ B22C 9/02 |
| | | | | 249/114.1 |
| 2014/0224152 A1 | | 8/2014 | Fukuda et al. | |
| 2017/0036263 A1 | * | 2/2017 | Nagai | ....................... B22C 1/18 |
| 2017/0056963 A1 | * | 3/2017 | Bartels | ................. B22C 1/2253 |

FOREIGN PATENT DOCUMENTS

| | | |
|---|---|---|
| DE | 10 2008 024 727 A1 | 11/2009 |
| JP | 5-169184 A | 7/1993 |
| JP | 9-141386 A | 6/1997 |
| JP | 2003-251434 A | 9/2003 |
| JP | 2004-202577 A | 7/2004 |
| JP | 2007-136540 A | 6/2007 |
| JP | 2011-520615 A | 7/2011 |
| JP | 5249447 B1 | 4/2013 |
| WO | 97/31732 A1 | 9/1997 |
| WO | 2015/029935 A1 | 3/2015 |

OTHER PUBLICATIONS

J-PlatPat English abstract of JP 2013-240799 A which corresponds to JP 5249447 B1.
J-PlatPat English abstract of JP 5-169184 A.
J-PlatPat English abstract of JP 2003-251434 A.
J-PlatPat English abstract of JP 2004-202577 A.
J-PlatPat English abstract of JP 2007-136540 A.
J-PlatPat English abstract of JP 9-141386 A.
Extended European Sear Report (ESR) dated Mar. 24, 2017 in connection with corresponding European Application No. 15812929.6.
Chinese Office Action dated Sep. 11, 2018 for Application No. CN 201580077536.6 with English translation.
Espacenet English abstract of CN 104066532 A.
Espacenet English abstract of CN 102076440 A.

* cited by examiner

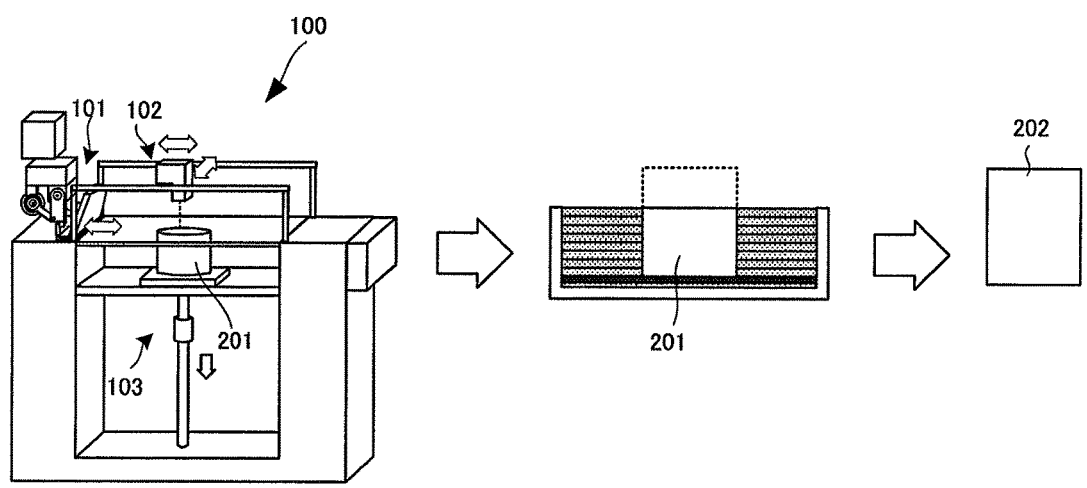
F I G. 1

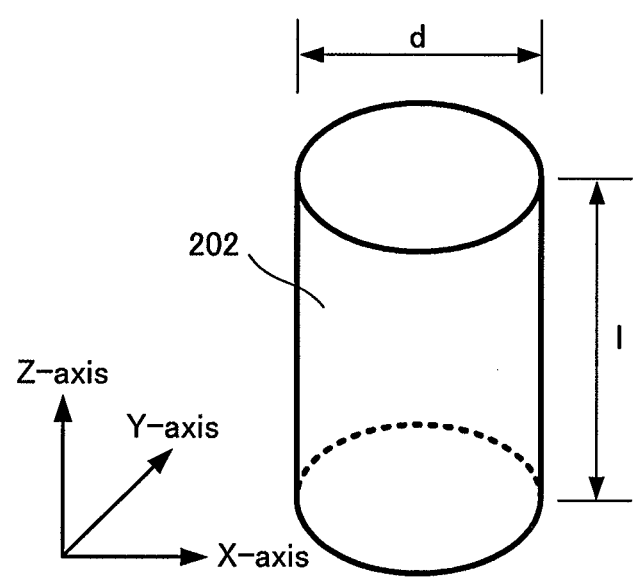
F I G. 2

ORGANIC BINDER, GRANULAR MATERIAL, THREE-DIMENSIONAL LAMINATION-SHAPED MOLD MANUFACTURING APPARATUS, AND THREE-DIMENSIONAL LAMINATION-SHAPED MOLD MANUFACTURING METHOD

RELATED APPLICATION

This application is an application under 35 U.S.C. 371 of International Application No. PCT/JP2015/056883 filed on Mar. 9, 2015, the entire contents of which are incorporated herein by reference.

TECHNICAL FIELD

The present invention relates to a three-dimensional lamination-shaped mold manufacturing technique.

BACKGROUND ART

A mold is necessary to manufacture a cast metal. Examples of the mold are a heat-curing mold, self-curing mold, and gas-curing mold. For example, the self-curing mold is generally manufactured by a method of filling kneaded sand containing a refractory granular material, hardener, and binder in a wooden model or resin model (to be collectively called "a model" hereinafter), and curing the binder. To manufacture a mold having a complicated shape, however, it is necessary to increase the number of models, and this complicates the process. Also, even when the number of models can be increased, no mold can be manufactured if the models cannot be removed from the mold.

To solve these problems, a mold manufacturing technique using three-dimensional lamination shaping capable of directly manufacturing a mold without using any model has been proposed. Three-dimensional lamination shaping is a method of manufacturing a mold by directly using a three-dimensional shape input on a CAD (Computer Aided Design) system as a stereomodel (three-dimensional model).

A known example of this mold manufacturing technique using three-dimensional lamination shaping is a method (two-component self-curing mold) of repeating an operation of laminating (recoating) kneaded sand obtained by mixing a refractory granular material and liquid hardener and printing a binder on the kneaded sand based on CAD data, and removing the kneaded sand from an unprinted portion after the binder is cured (see, e.g., patent literature 1).

CITATION LIST

Patent Literature

Patent literature 1: Japanese Patent No. 5249447

SUMMARY OF THE INVENTION

Technical Problem

When manufacturing a mold by three-dimensional lamination shaping of a two-component self-curing mold, however, the liquid hardener is mixed in the kneaded sand in the unprinted portion. Therefore, recoating is sometimes difficult because the fluidity of the kneaded sand is low depending on the type of granular material. In this case, the recoating property is ensured by mixing a granular material which increases the fluidity of kneaded sand and a granular material which decreases the fluidity of kneaded sand. Also, the kneaded sand in the binder unprinted portion is green. To reuse the kneaded sand, therefore, the sand must be regenerated by calcination and used as reusable sand, and this process is time-consuming.

The present invention enables to provide a technique of solving the above-described problem.

Solution to Problem

One aspect of the present invention provides a granular material for use in shaping a three-dimensional laminated mold, the granular material being coated with an acid as a catalyst which activates and cures an organic binder binding the granular material.

Another aspect of the present invention provides an organic binder for use in shaping a three-dimensional laminated mold, which is activated and cured by using, as a catalyst, an acid coating a granular material, the organic binder being one of
furfuryl alcohol only, and
a mixture of furfuryl alcohol and at least one material selected from the group consisting of 2,5-bis(hydroxymethyl)furan, a phenol group, and a bisphenol group.

Still another aspect of the present invention provides an organic binder for use in shaping a three-dimensional laminated mold, which is activated and cured by using, as a catalyst, an acid coating a granular material,
the organic binder being one of a condensate and a cocondensate of an aldehyde group and at least one material selected from a phenol group and a bisphenol group.

Still another aspect of the present invention provides an organic binder for use in shaping a three-dimensional laminated mold, which is activated and cured by using, as a catalyst, an acid coating a granular material, the organic binder being one of
a mixture of furfuryl alcohol and one of a condensate and a cocondensate of an aldehyde and at least one material selected from a phenol group and a bisphenol group, and
a mixture of furfuryl alcohol, 2,5-bis(hydroxymethyl)furan, and one of a condensate and a cocondensate of an aldehyde and at least one material selected from a phenol group and a bisphenol group.

Still another aspect of the present invention provides an organic binder for use in shaping a three-dimensional laminated mold, which is activated and cured by using, as a catalyst, an acid coating a granular material, the organic binder being one of
a mixture of urea, an aldehyde condensate, and furfuryl alcohol, and
a mixture of urea, an aldehyde condensate, furfuryl alcohol, and 2,5-bis(hydroxymethyl)furan.

Still another aspect of the present invention provides an apparatus for manufacturing a three-dimensional lamination-shaped mold, in said apparatus,
a granular material coated with an acid being used, as a shaping material which is spread into layers and selectively bound, and
an organic binder being used, as a binder which selectively binds the granular material coated with the acid.

Still another aspect of the present invention provides a method of manufacturing a three-dimensional lamination-shaped mold, the method comprising
coating a granular material for use in shaping a three-dimensional laminated mold with an acid, spreading the granular material coated with the acid into layers, selectively discharging an organic binder to the granular material spread into layers and curing the organic binder, such that the granular material spread into layers is bound in accordance with a three-dimensional laminated mold as an object, and repeating the spreading and the curing until the three-dimensional laminated mold as the object is shaped.

Advantageous Effects of Invention

According to the present invention, in the manufacture of a three-dimensional lamination-shaped mold, it is possible to well perform recoating regardless of the type of granular material, and use a refractory aggregate in an unprinted portion without any regeneration process.

BRIEF DESCRIPTION OF DRAWINGS

FIG. 1 is view showing a three-dimensional lamination-shaped mold manufacturing apparatus of this embodiment and an outline of the shaping procedure; and FIG. 2 is a view showing a columnar laminated product manufacturing by examples.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<<Three-Dimensional Lamination-Shaped Mold Manufacturing Method>>

FIG. 1 is a view showing an outline of the shaping procedure of a three-dimensional lamination-shaped mold manufacturing apparatus 100 of this embodiment.

The three-dimensional lamination-shaped mold manufacturing apparatus 100 mainly includes a blade mechanism 101, printing nozzle head mechanism 102, and support table mechanism 103. The apparatus further includes a controller (not shown) for controlling the operation of each mechanism by using three-dimensional data of a shaping target.

The blade mechanism 101 includes a recoater, and laminates, on a shaping portion bound by an organic binder, an acid-coated granular material (to be also referred to as coating sand hereinafter) having a predetermined thickness as the material of a three-dimensional lamination-shaped mold. The printing nozzle head mechanism 102 performs printing on the laminated granular material by using the organic binder, thereby shaping one layer by binding the granular material. The shaping table mechanism 103 moves down by the distance of one layer when shaping of one layer is complete, thereby implementing lamination shaping by a predetermined thickness.

FIG. 1 shows an unfinished shaped product 201 and finished shaped product 202.

<<Manufacturing Materials of Three-Dimensional Lamination-Shaped Mold>>

As manufacturing materials for use in the three-dimensional lamination-shaped mold manufacturing apparatus 100 of this embodiment, the granular material and binder will be explained in detail below.

(Granular Material)

Examples of the granular material of this embodiment are natural sand such as silica sand, olivine sand, zircon sand, chromite sand, alumina sand, and mullite sand, and artificial sand, each of which is a granular material having a fire resistance (to be also referred to as a refractory granular material hereinafter). It is also possible to use collected used natural sand or artificial sand, or regenerated used natural sand or artificial sand.

Artificial sand is generally obtained by a sintering method, fusion method, or flame-fusion method by using bauxite as a raw material. Note that the practical conditions and the like of the sintering method, fusion method, or flame-fusion method are not particularly limited, so artificial sand need only be manufactured by using the well-known conditions and the like described in, e.g., Japanese Patent Laid-Open Nos. 5-169184, 2003-251434, and 2004-202577.

The average grain size of the refractory granular material is preferably 50 to 300 μm, and more preferably, 75 to 150 μm. When the average grain size is 300 μm or less, a three-dimensional lamination-shaped mold having a high surface phase degree is obtained.

"A surface phase degree" herein mentioned is the surface roughness of the three-dimensional lamination-shaped mold in the lamination direction.

As the refractory granular material, artificial sand hardly expands due to fire or heat (the thermal expansibility is low). If the thermal expansibility is high, a veining defect readily occurs. "A veining defect" herein mentioned is a burr-like defect which occurs when a mold cracks due to thermal expansion during casting and a molten metal flows into the crack. When artificial sand is used as the refractory granular material, it is possible to manufacture a large-sized mold or a mold which can be used even when pouring a high-temperature molten metal. That is, a veining defect hardly occurs.

Note that natural sand is more inexpensive than artificial sand, so it is favorable to mix natural sand and artificial sand in order to reduce the manufacturing cost.

Silica sand is favorable as natural sand. This is so because, e.g., zircon sand is relatively expensive as natural sand, chromite sand cannot easily be discarded because it contains chromium, and olivine sand tends to increase the surface phase degree of a three-dimensional lamination-shaped mold. silica sand can alleviate these problems.

A mold is used to cast a cast metal, and disassembled after casting in order to extract the cast metal. That is, the cast metal is a final object (final product), but the mold is finally destroyed. Accordingly, a readily discardable inexpensive material having a sufficiently low surface phase degree is preferable.

(Acid Coating)

In this embodiment, the material of a shaped product is obtained by coating the surface of a refractory granular material with an acid. First, the refractory granular material is heated to about 120° C. in advance. Then, an acid solution prepared by dissolving an acid in a solvent (mainly, water) is added to the heated refractory granular material, and the solvent of the acid solution is volatilized by the heat of the heated refractory granular material and stirring of the acid solution. The surface of the refractory granular material is coated with the acid by the series of steps described above.

As the acid, sulfuric acid, phosphoric acid, a sulfonic acid, or a carboxylic acid is used. Examples of the sulfonic acid are para toluene sulfonic acid, xylene sulfonic acid, benzene sulfonic acid, and methane sulfonic acid. Examples of the carboxylic acid are lactic acid, citric acid, malic acid, tartaric acid, malonic acid, maleic acid, oxalic acid, and benzoic acid.

Of these acids, sulfuric acid has a high catalytic ability to cure the binder. Therefore, curing after binder printing rapidly progresses, and this makes it difficult to manufacture a lamination-shaped mold. Accordingly, a solution mixture of sulfuric acid and another acid is prepared, and the refractory granular material is coated with the acid by the above-mentioned steps.

Also, phosphoric acid contains no sulfur component, and has catalytic ability next to that of sulfuric acid. Therefore, phosphoric acid is singly used, or a solution mixture of phosphoric acid and sulfuric acid, a sulfonic acid, or a carboxylic acid is prepared, and the refractory granular material is coated with the acid by the above-mentioned steps.

On the other hand, a carboxylic acid has a low catalytic ability to cure the binder, so a solution mixture of a carboxylic acid and another acid such as sulfuric acid or a sulfonic acid is prepared, and the refractory granular material is coated with the acid by the above-mentioned steps. Furthermore, a sulfonic acid has a sufficient catalytic ability to cure the binder. Accordingly, a sulfonic acid is singly used, or a solution mixture of a sulfonic acid and another acid such as sulfuric acid or a carboxylic acid is prepared, and the refractory granular material is coated with the acid by the above-mentioned steps.

The coated refractory granular material preferably has the coating solution which is a solid rather than a liquid. This is so because when the coating layer is a solid, the cohesive force of the refractory granular material decreases, and a good coating property is secured. As the above-described acid, therefore, it is more favorable to use an acid which is a solid at room temperature (20° C.).

(Organic Binder)

The binder is one of furfuryl alcohol, a mixture of furfuryl alcohol and at least one material selected from the group consisting of 2,5-bis(hydroxymethyl)furan, a phenol, and a bisphenol, a condensate or cocondensate of a phenol, a bisphenol, and an aldehyde, a mixture of furfuryl alcohol and a condensate or cocondensate of a phenol, a bisphenol, and an aldehyde, a mixture of furfuryl alcohol, 2,5-bis(hydroxymethyl)furan, and a condensate or cocondensate of a phenol, a bisphenol, and an aldehyde, a mixture of furfuryl alcohol and a condensate of urea and an aldehyde, and a mixture of furfuryl alcohol, 2,5-bis(hydroxymethyl)furan, and a condensate of urea and an aldehyde.

Examples of the phenol are phenol, cresol, resorcin, nonyl phenol, and a cashew nutshell liquid.

Examples of the bisphenol are bisphenol A, bisphenol F, bisphenol C, bisphenol S, and bisphenol Z.

Examples of the aldehyde are formaldehyde, para formaldehyde, acetaldehyde, furfural, glyoxazale, glutardialdehyde, and dialdehyde phthalate.

In the condensate or cocondensate of a phenol, a bisphenol, and an aldehyde, it is possible to singly use one of a phenol and a bisphenol or mix a phenol and a bisphenol. It is particularly favorable to use a cocondensate of a phenol and a bisphenol because a strong three-dimensional lamination-shaped mold is readily obtained.

The use amount of an aldehyde in a phenol-based compound is preferably 1.0 to 3.5 time mole, more preferably, 1.1 to 2.5 time mole, and particularly preferably, 1.3 to 1.7 time mole with respect to the total number of moles of the phenol-based compound. When the use amount of an aldehyde is 1.0 time mole or more with respect to the total number of moles of the phenol-based compound, the strength of the three-dimensional lamination-shaped mold increases. On the other hand, when the use amount of an aldehyde is 3.5 time mole or less with respect to the total number of moles of the phenol-based compound, the amount of an unreacted aldehyde can be reduced. If an unreacted aldehyde remains, the amount of a harmful aldehyde increases during lamination shaping.

In a reaction between urea and an aldehyde, the use amount of the aldehyde is preferably 1.0 to 3.0 time mole, more preferably, 1.3 to 2.5 time mole, and particularly preferably, 1.5 to 2.0 time mole.

Furthermore, a silane coupling agent may also be added to the binder in order to increase the strength of the three-dimensional lamination-shaped mold.

Examples of the silane coupling agent are N-β(aminoethyl)γ-aminopropylmethyldimethoxysilane, γ-aminopropyltriethoxysilane, γ-(2-aminoethyl)aminopropyltrimethoxysilane, and γ-glycidoxypropyltrimethoxysilane.

The addition amount of the silane coupling agent is preferably 0.01 to 3.0 pts. mass, and more preferably, 0.1 to 2.0 pts. mass with respect to 100 pts. mass of the binder. When the addition amount of the silane coupling agent is 0.01 pts. mass or more, a sufficient effect of increasing the strength of the three-dimensional lamination-shaped mold is obtained. The ease with which this effect of increasing the strength of the three-dimensional lamination-shaped mold is obtained increases as the addition amount of the silane coupling agent increases. However, the effect reaches its peak even when the addition amount keeps increasing. Accordingly, the addition amount of the silane coupling agent is preferably 3.0 pts. mass or less.

<<Granular Material Laminating Process and Organic Binder Printing Process>>

For example, the processes of laminating the acid-coated refractory granular material and printing the binder on it are performed as follows.

First, a refractory granular material is laminated on the bottom surface of a metal case placed in a three-dimensional lamination shaping apparatus (available from CMET) using a printing shaping method, by the blade mechanism 101 including the recoater. Then, the printing nozzle head is scanned on the laminated refractory granular material by the printing nozzle head mechanism 102 based on data obtained by 3DCAD design of the shape of a three-dimensional lamination-shaped mold, thereby printing the binder. The bottom surface of the metal case is a shaping table, and vertically movable by the shaping table mechanism 103. After the binder is printed, the bottom surface (shaping table) of the metal case is moved down by one layer, the refractory granular material is laminated in the same manner as above, and the binder is printed on it. These operations are repeated. The thickness of one layer is preferably 100 to 500 μm, and more preferably, 200 to 300 μm.

The coating amount when printing the binder is not particularly limited. When the mass of one layer of the granular material is 100 pts. mass, however, the coating amount is preferably 0.4 to 10 pts. mass, and more preferably, 0.8 to 5 pts. mass.

<<Functions and Effects of This Embodiment>>

In this embodiment, the refractory granular material is coated with an acid as a catalyst for curing the binder. When compared to the conventional method by which an acid is mixed, therefore, the fluidity is higher, and the refractory granular material in an unprinted portion is directly reusable.

When a three-dimensional lamination-shaped mold is manufactured by using natural sand such as silica sand as the refractory granular material, a veining defect easily occurs in the obtained mold. The reason for this is probably as follows.

Since natural sand has a phase transition point, the volume expands by the heat of casting. In particular, the inside (a portion in contact with a molten metal) of the mold easily expands because the heat of the molten metal is easily transferred, but the outside of the mold hardly expands because the heat of the molten metal is hardly transferred. This difference between the expansions of the inside and outside generates a crack inside the mold.

By contrast, artificial sand of this embodiment hardly causes phase transition, and hence hardly expands by the heat of casting. Accordingly, a mold manufactured by using artificial sand hardly causes a veining defect.

When manufacturing a mold by using the two-component self-curing mold of the related art, however, recoating is performed by mixing a liquid hardener in artificial sand. When the liquid hardener is mixed in artificial sand, the fluidity decreases, and the recoating property often deteriorates.

To increases the fluidity of artificial sand, there is a method of mixing the liquid hardener in a mixture of artificial sand and natural sand.

Unfortunately, a mold obtained by this method can resist the pouring temperature of a molten metal if the temperature is low (e.g., when pouring aluminum), but cannot resist the pouring temperature if the temperature is high (e.g., when pouring iron). This makes it difficult to manufacture a large-sized mold. This is so because the ease with which a veining defect occur increases as the size of a mold increases. The reason for this is presumably as follows.

A molten metal poured into a mold cools down and solidifies from the outside (a portion in contact with the mold) rather than the central portion. When the mold is small, the molten metal cools down within a short time, so the molten metal on the outside cools down and solidifies before the mold cracks. Even when the mold cracks after that, therefore, it is perhaps possible to prevent the molten metal from flowing into the crack. On the other hand, when the mold is large, the molten metal takes a long time to cool down. Therefore, the mold probably cracks and causes a veining defect before the molten metal on the outside completely solidifies.

In this embodiment, however, the refractory granular material is coated with the liquid hardener instead of mixing the latter in the former, so it is possible to solve the problem of fluidity arising when using artificial sand as the refractory granular material. That is, in this embodiment, recoating can be performed even when singly using artificial sand. This makes it possible to manufacture a large-sized mold which can resist (that is, which hardly causes a veining defect) even when pouring a high-temperature molten metal.

In addition, the three-dimensional lamination-shaped mold manufacturing apparatus using the acid-coated refractory granular material and organic binder according to this embodiment can manufacture a three-dimensional lamination-shaped mold at a speed higher than 50,000 cc, e.g., at a speed of 100,000 cc, and can also maintain the strength of the three-dimensional lamination-shaped mold.

For example, the upper limit of the manufacturing speed of the two-component self-curing mold described in patent literature 1 is 50,000 cc. This is so because the liquid hardener added to the granular material decreases the fluidity, so the fluidity is maintained by reducing the liquid hardener, and the amount of binder is increased, and as a consequence the curing time prolongs. Furthermore, when the fluidity of the granular material is low, it is necessary to add vibrations to the blade mechanism 101 including the recoater.

Since the acid-coated granular material of this embodiment is spherical and dry, the recoating property improves, and this makes high-speed three-dimensional lamination-shaped mold manufacture possible.

EXAMPLES

Examples of the present invention will be explained in more detail below, but the present invention is not limited to these examples. Note that the binder used in these examples will be presented below. Note also that a method of measuring the thermal expansion coefficient of a test piece obtained by each example will be presented below.

(Organic Binder)

The binder was obtained by mixing 0.3 pts. mass of N-β(aminoethyl)γ-aminopropylmethyldimethoxysilane in 100 pts. mass of a solution mixture containing 90 pts. mass of furfuryl alcohol and 10 pts. mass of bisphenol A.

(Coating Sand)

The refractory granular material was heated to 120° C. by a sand heater. A mixture of 65 pts. mass of para toluene sulfonic acid which is a solid at room temperature (20° C.) and 10 pts. mass of lactic acid was dissolved in water, thereby preparing an aqueous 75-mass % solution. After 0.3 pts. mass of the aqueous solution were added to 100 pts. mass of the heated refractory granular material, the water as a solvent was volatilized by stirring the material for 5 min. Then, the material was cooled to room temperature (25° C.), and passed through a sieve having an opening of 0.6 mm, thereby forming coating sand.

(Measurement of Thermal Expansion Coefficient)

The thermal expansion coefficient of a test piece was measured as follows based on JACT test method M-2 (a rapid thermal expansion coefficient measurement test method of thermal expansion test methods).

The test piece was inserted into a furnace heated to 1,000° C., the expansion was measured for 5 min by a thermal expansion meter, and the thermal expansion coefficient was calculated by:

Thermal expansion coefficient (%)={expansion (mm)/length (mm) of unheated test piece}×100

<<Results of Examples and Comparative Examples>>

Examples 1 to 4 and Comparative Examples 1 to 5 will be explained below in order with reference to the results of the examples shown in Table 1 and the results of the comparative examples shown in Table 2.

TABLE 1

| | | | Examples | | | |
|---|---|---|---|---|---|---|
| | Refractory granular material | | Example 1 Sintered artificial sand | Example 2 Fused artificial sand | Example 3 Flame-fused artificial sand | Example 4 Silica sand |
| Evaluation | Feasibility of lamination shaping | X-axis direction | Feasible | Feasible | Feasible | Feasible |
| | | Y-axis direction | Feasible | Feasible | Feasible | Feasible |
| | | Z-axis direction | Feasible | Feasible | Feasible | Feasible |
| | Thermal expansion coefficient (%) | X-axis direction | 0.10 | 0.20 | 0.10 | 1.49 |
| | | Y-axis direction | 0.10 | 0.20 | 0.10 | 1.49 |
| | | Z-axis direction | 0.11 | 0.22 | 0.11 | 1.51 |
| | Necessity of regeneration of sand in unprinted portion | | Unnecessary | Unnecessary | Unnecessary | Unnecessary |

TABLE 2

| | | | Comparative Examples | | | | |
|---|---|---|---|---|---|---|---|
| | Refractory granular material | | Comparative Example 1 Sintered artificial sand | Comparative Example 2 Fused artificial sand | Comparative Example 3 Flame-fused artificial sand | Comparative Example 4 Silica sand | Comparative Example 5 Fused artificial sand/Silica sand (60/40) |
| Evaluation | Feasibility of lamination shaping | X-axis direction | Feasible | Unfeasible | Unfeasible | Feasible | Feasible |
| | | Y-axis direction | Feasible | Unfeasible | Unfeasible | Feasible | Feasible |
| | | Z-axis direction | Feasible | Unfeasible | Unfeasible | Feasible | Feasible |
| | Thermal expansion coefficient (%) | X-axis direction | 0.11 | Immeasurable | Immeasurable | 1.50 | 0.79 |
| | | Y-axis direction | 0.10 | Immeasurable | Immeasurable | 1.50 | 0.80 |
| | | Z-axis direction | 0.11 | Immeasurable | Immeasurable | 1.51 | 0.80 |
| | Necessity of regeneration of sand in unprinted portion | | Calcination | Not performed | Not performed | Calcination | Calcination |

Examples 1-4

Example 1

Coating sand using artificial sand (CERABEADS X #1450 manufactured by ITOCHU CERATECH, average gran size=106 μm) obtained by a sintering method was prepared as a refractory granular material.

This refractory granular material was laminated on the bottom surface of a metal case placed in a three-dimensional laminating apparatus (manufactured by CMET) using a printing shaping method, by using a blade mechanism including a recoater. In this process, the aperture gap of the recoater was adjusted to about 0.5 mm based on the fluidity of the coating sand.

Then, a printing nozzle head was scanned on the laminated refractory granular material based on data obtained by 3DCAD design of the shape of a three-dimensional lamination-shaped mold, thereby printing a binder such that the discharge amount was 2.3 pts. mass with respect to 100 pts. mass of the laminated sand. After the binder was printed, the bottom surface (a shaping table) of the metal case was moved down by one layer (280 μm), the refractory granular material was laminated in the same manner as above, and the binder was printed on the laminated refractory granular material such that the discharge amount was 2.3 pts. mass with respect to 100 pts. mass of the laminated sand. By repeating this process including lamination and printing, a columnar laminated product 202 having a diameter d of 30 mm and a length L of 50 mm as shown in FIG. 2 was manufactured.

Note that three types of the laminated products 202 were manufactured by repeating the process of laminating the granular material in the three directions of X-, Y-, and Z-axes shown in FIG. 2, and printing the binder on the laminated refractory granular material. In this process, whether lamination was feasible (the feasibility of lamination) in each direction was visually checked. Table 1 shows the checking results of the feasibility of lamination.

After printing, a columnar test piece (three-dimensional lamination-shaped mold) having a diameter of 30 mm and a length of 50 mm was obtained by removing the refractory granular material from a binder unprinted portion by a brush.

The thermal expansion coefficient of each obtained test piece was measured. Table 1 shows the measurement results of the thermal expansion coefficient.

Also, the refractory granular material in the binder unprinted portion was not regenerated but reused as reusable sand.

Example 2

Test pieces were manufactured and evaluated following the same procedures as in Example 1, except that coating sand using artificial sand (AR SAND #1000 manufactured by ITOH KIKOH, average grain size=106 μm) obtained by a fusion method was used as the refractory granular material, and the recoater aperture was adjusted to 1 mm. Table 1 shows the evaluation results of Example 2.

Also, the refractory granular material in a binder unprinted portion was not regenerated but reused as reusable sand.

Example 3

Test pieces were manufactured and evaluated following the same procedures as in Example 1, except that coating sand using artificial sand (LUNAMOS MS#110 manufactured by KAO QUAKER, average grain size=106 μm) obtained by a flame-fusion method was used as the refractory granular material, and the recoater aperture was adjusted to 1 mm. Table 1 shows the evaluation results of Example 3.

Also, the refractory granular material in a binder unprinted portion was not regenerated but reused as reusable sand.

Example 4

Test pieces were manufactured and evaluated following the same procedures as in Example 1, except that coating sand using silica sand (FS001-EU distributed by EX ONE, average grain size=106 μm) was used as the refractory granular material. Table 1 shows the evaluation results of Example 4.

Also, the refractory granular material in a binder unprinted portion was not regenerated but reused as reusable sand.

Comparative Examples 1-5

Comparative Example 1

A hardener solution containing 55 pts. mass of xylene sulfonic acid which is a liquid at room temperature (20° C.), 10 pts. mass of sulfuric acid, and 35 pts. mass of water was prepared. 0.3 pts. mass of the hardener were added to 100 pts. mass of artificial sand (CERABEADS X #1450 manufactured by ITOCHU CERATECH, average gran size=106 μm) obtained by a sintering method, and the obtained material was kneaded, thereby obtaining kneaded sand.

The obtained refractory granular material was laminated on the bottom surface of a metal case placed in a three-dimensional laminating apparatus (manufactured by CMET) using a printing shaping method, by using a blade mechanism including a recoater. In this process, the aperture gap of the recoater was adjusted to about 2 mm based on the fluidity of the kneaded sand. Then, a printing nozzle head was scanned on the laminated refractory granular material based on data obtained by 3DCAD design of the shape of a three-dimensional lamination-shaped mold, thereby printing a binder such that the discharge amount was 2.3 pts. mass with respect to 100 pts. mass of the laminated sand. After the binder was printed, the bottom surface (a shaping table) of the metal case was moved down by one layer (280 μm), the refractory granular material was laminated in the same manner as above, and the binder was printed on the laminated refractory granular material such that the discharge amount was 2.3 pts. mass with respect to 100 pts. mass of the laminated sand. By repeating this process including lamination and printing, a columnar laminated product 202 having a diameter d of 30 mm and a length L of 50 mm as shown in FIG. 2 was manufactured.

Note that three types of the laminated products 202 were manufactured by repeating the process of laminating the granular material in the three directions of X-, Y-, and Z-axes shown in FIG. 2, and printing the binder on the laminated refractory granular material. In this process, whether lamination was feasible (the feasibility of lamination) in each direction was visually checked. Table 2 shows the checking results of the feasibility of lamination.

After printing, a columnar test piece (three-dimensional lamination-shaped mold) having a diameter of 30 mm and a length of 50 mm was obtained by removing the refractory granular material from a binder unprinted portion by a brush.

The thermal expansion coefficient of each obtained test piece was measured. Table 2 shows the measurement results of the thermal expansion coefficient.

Also, since the kneaded sand in the binder unprinted portion was green, the kneaded sand was regenerated by calcination and reused as reusable sand.

Comparative Example 2

0.3 pts. mass of the hardener prepared in Comparative Example 1 were added to 100 pts. mass of artificial sand (AR SAND #1000 manufactured by ITOH KIKOH, average grain size=106 μm) obtained by a fusion method, and the obtained material was kneaded, thereby obtaining kneaded sand.

A test piece manufacturing process was performed following the same procedures as in Comparative Example 1, except that the obtained kneaded sand was used as the refractory granular material. However, aggregation of the sand grains was intense, so recoating of the kneaded sand was impossible.

Comparative Example 3

0.3 pts. mass of the hardener prepared in Comparative Example 1 were added to 100 pts. mass of artificial sand (LUNAMOS MS#110 manufactured by KAO QUAKER, average grain size=106 μm) obtained by a flame-fusion method, and the obtained material was kneaded, thereby obtaining kneaded sand.

A test piece manufacturing process was performed following the same procedures as in Comparative Example 1, except that the obtained kneaded sand was used as the refractory granular material. However, aggregation of the sand grains was intense, so recoating of the kneaded sand was impossible.

Comparative Example 4

0.3 pts. mass of the hardener prepared in Comparative Example 1 were added to 100 pts. mass of silica sand (FS001-EU distributed by EX ONE, average grain size=106 µm), and the obtained material was kneaded, thereby obtaining kneaded sand.

Test pieces were manufactured and evaluated following the same procedures as in Comparative Example 1, except that the obtained kneaded sand was used as the refractory granular material. Table 2 shows the evaluation results of Comparative Example 4.

Also, since the kneaded sand in a binder unprinted portion was green, the kneaded sand was regenerated by calcination and reused as reusable sand.

Comparative Example 5

0.3 pts. mass of the hardener prepared in Comparative Example 1 were added to 100 pts. mass of a sand mixture obtained by mixing artificial sand (AR SAND #1000 manufactured by ITOH KIKOH, average grain size=106 µm) and silica sand (FS001-EU distributed by EX ONE, average grain size=106 µm) at a mass ratio of 60:40, and the obtained material was kneaded, thereby obtaining kneaded sand.

Test pieces were manufactured and evaluated following the same procedures as in Comparative Example 1, except that the obtained kneaded sand was used as the refractory granular material. Table 2 shows the evaluation results of Comparative Example 5.

Also, since the kneaded sand in a binder unprinted portion was green, the kneaded sand was regenerated by calcination and reused as reusable sand.

<<Evaluation of Examples and Comparative Examples>>

The refractory granular materials used in the examples had high fluidity, so recoating of these materials was well possible in the directions of all of the X-, Y-, and Z-axes. Also, the refractory granular material in the unprinted portion was reusable without any regeneration process. In particular, the thermal expansion coefficients were small in Examples 1 to 3 using artificial sand as the refractory granular materials.

A small thermal expansion coefficient means that a veining defect hardly occurs even when pouring a high-temperature molten metal.

By contrast, when the liquid hardener was mixed in the refractory granular material, shaping was possible only when using sintered artificial sand in Comparative Example 1, silica sand in Comparative Example 4, and a mixture of fused artificial sand and silica sand in Comparative Example 5. Since, however, the liquid hardener was mixed in the kneaded sand in the unprinted portion, it was necessary to regenerate the kneaded sand in order to reuse it.

The invention claimed is:

1. A composition for use in shaping a three-dimensional laminated mold, the composition comprising a granular material coated with a coating layer, the coating layer comprising an acid capable of acting as a catalyst to activate and cure an organic binder for binding the granular material, wherein the coating layer is coated on the granular material by mixing the granular material with a solution comprising the acid and a solvent and volatizing the solvent.

2. The composition according to claim 1, wherein said acid contains at least one of sulfuric acid, phosphoric acid, a sulfonic acid, and a carboxylic acid.

3. The composition according to claim 2, wherein said acid is one of a mixture of sulfuric acid and another acid, phosphoric acid only, a mixture of phosphoric acid and another acid, sulfonic acid only, a mixture of sulfonic acid and another acid, and a mixture of a carboxylic acid and another acid.

4. The composition according to claim 2, wherein the sulfonic acid contains at least one of para toluene sulfonic acid, xylene sulfonic acid, benzene sulfonic acid and methane sulfonic acid, and the carboxylic acid contains at least one of lactic acid, citric acid, malic acid, tartaric acid, malonic acid, maleic acid, oxalic acid and benzoic acid.

5. The composition according to claim 1, wherein the granular material is heated before mixing with the acid solution and the solvent is volatilized by heat of the heated granular material and stirring of the acid solution.

6. The composition according to claim 1, wherein the granular material is refractory artificial sand obtained by one of a sintering method, a fusion method and a flame-fusion method.

7. A composition for use in shaping a three-dimensional laminated mold, the composition being formed by applying an organic binder to a granular material that is coated with a coating layer formed on the granular material by mixing the granular material with a solution comprising an acid and a solvent and volatizing the solvent, wherein the acid acts as a catalyst to activate and cure the organic binder to bind the granular material, the organic binder being one of:
 furfuryl alcohol only; and
 a mixture of furfuryl alcohol and at least one material selected from the group consisting of 2,5-bis(hydroxymethyl)furan, a phenol group, and a bisphenol group.

8. A composition for use in shaping a three-dimensional laminated mold, the composition being formed by applying an organic binder to a granular material that is coated with a coating layer formed on the granular material by mixing the granular material with a solution comprising an acid and a solvent and volatizing the solvent, wherein the acid acts as a catalyst to activate and cure the organic binder to bind the granular material,
 the organic binder being one of a condensate and a cocondensate of an aldehyde group and at least one material selected from a phenol group and a bisphenol group.

9. A composition for use in shaping a three-dimensional laminated mold, the composition being formed by applying an organic binder to a granular material that is coated with a coating layer coated on the granular material by mixing the granular material with a solution comprising an acid and a solvent and volatizing the solvent, wherein the acid acts as a catalyst to activate and cure the organic binder to bind the granular material, the organic binder being one of:
 a mixture of furfuryl alcohol and one of a condensate and a cocondensate of an aldehyde and at least one material selected from a phenol group and a bisphenol group; and
 a mixture of furfuryl alcohol, 2,5-bis(hydroxymethyl)furan, and one of a condensate and a cocondensate of an aldehyde and at least one material selected from a phenol group and a bisphenol group.

10. An organic binder for use in shaping a three-dimensional laminated mold, the composition being formed by applying an organic binder to a granular material that is coated with a coating layer coated on the granular material by mixing the granular material with a solution comprising an acid and a solvent and volatizing the solvent, wherein the acid acts as a catalyst to activate and cure the organic binder to bind the granular material, the organic binder being one of:

a mixture of urea, an aldehyde condensate and furfuryl alcohol; and a mixture of urea, an aldehyde condensate, furfuryl alcohol and 2,5-bis(hydroxymethyl)furan.

11. A system for manufacturing a three-dimensional lamination-shaped mold, said system comprising:

a granular material coated with a coating layer comprising an acid, wherein the coating layer is coated on the granular material by mixing the granular material with a solution comprising the acid and a solvent and volatizing the solvent;

an organic binder which is activated and cured by the acid in the coating layer when the binder is printed on the coated granular material so that the binder selectively binds said granular material coated with said acid;

means for laminating the granular material on a shaping target to form laminated granular material; and means for printing the organic binder on the laminated granular material so that the binder is activated and cured by the acid in the coating layer and selectively binds the laminated granular material.

12. A method of manufacturing a three-dimensional lamination-shaped mold, said method comprising the steps of:

(a) coating a granular material with an acid by mixing the granular material with a solution comprising the acid and a solvent and volatizing the solvent, wherein the acid is capable of acting as a catalyst to activate and cure an organic binder;

(b) spreading the granular material coated with the acid into layers;

(c) selectively discharging the organic binder to the granular material spread into layers to activate and cure the organic binder so as to bind the granular material spread into layers and form the three-dimensional laminated mold as an object; and (d) repeating steps (b) and (c) until the three-dimensional laminated mold as the object is shaped.

13. The method according to claim 12, wherein the volatizing in step (a) comprises heating the granular material before mixing with the acid solution such that the solvent is volatilized by heat from the heated granular material and stirring of the acid solution.

14. The method according to claim 12, wherein the granular material is heated to a temperature of about 120° C. in step (a).

* * * * *